United States Patent
Kasteel

(10) Patent No.: US 10,442,414 B2
(45) Date of Patent: Oct. 15, 2019

(54) METHOD FOR OPERATING A MOTOR-VEHICLE BRAKING SYSTEM

(71) Applicants: FORD GLOBAL TECHNOLOGIES, LLC, Dearborn, MI (US); FORD-WERKE GMBH, Köln (DE)

(72) Inventor: Evert H. A. Kasteel, Lommel (BE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/756,396

(22) PCT Filed: Aug. 31, 2016

(86) PCT No.: PCT/EP2016/070451
§ 371 (c)(1),
(2) Date: Feb. 28, 2018

(87) PCT Pub. No.: WO2017/037080
PCT Pub. Date: Mar. 9, 2017

(65) Prior Publication Data
US 2018/0251106 A1      Sep. 6, 2018

(30) Foreign Application Priority Data
Sep. 1, 2015   (DE) .................. 10 2015 216 705

(51) Int. Cl.
*G06F 7/70*      (2006.01)
*G06F 19/00*     (2018.01)
(Continued)

(52) U.S. Cl.
CPC ............ *B60T 8/1755* (2013.01); *B60T 8/176* (2013.01); *B60T 2201/03* (2013.01);
(Continued)

(58) Field of Classification Search
CPC .......... B60T 8/1755; B60T 8/176; B60T 8/34; B60T 8/60; B60T 8/88; F16D 55/26; G06F 17/00
(Continued)

(56) References Cited

U.S. PATENT DOCUMENTS

| 5,366,280 A | 11/1994 | Littlejohn |
| 5,366,281 A | 11/1994 | Littlejohn |

(Continued)

FOREIGN PATENT DOCUMENTS

| DE | 10247853 A1 | 4/2004 |
| DE | 102010031140 A1 | 12/2012 |

(Continued)

*Primary Examiner* — Mahmoud S Ismail
(74) *Attorney, Agent, or Firm* — Raymond L. Coppiellie; Burgess Law Office, PLLC

(57) ABSTRACT

A method for operating a braking system of a motor vehicle equipped with a wheel-slip control device, wherein the braking system includes an electrohydraulic service brake, set to generate braking forces independently of an actuation by an operator. The system having a mechanical or electro-mechanical parking brake actuated by an actuating element, and acting, in particular, on the rear wheels of the motor vehicle. An operator-side intent to actuate the parking brake is recognized and subsequently during the actuation of the parking brake a hydraulic pressure of the service brake is generated that acts on at least one rear wheel, of the motor vehicle capable of being braked by the parking brake. The hydraulic pressure sufficient to assist the parking brake and correspondingly lock the rear wheel of the motor vehicle braked by the parking brake during travel of the motor vehicle.

12 Claims, 1 Drawing Sheet

(51) Int. Cl.
  *G06G 7/00*    (2006.01)
  *G06G 7/76*    (2006.01)
  *B60T 8/1755*  (2006.01)
  *B60T 8/176*   (2006.01)
  *B60T 7/12*    (2006.01)
  *G05D 1/00*    (2006.01)
  *G06F 7/00*    (2006.01)
  *G06F 17/00*   (2019.01)
  *F16D 55/26*   (2006.01)
  *B60T 8/34*    (2006.01)
  *B60T 8/60*    (2006.01)
  *B60T 8/88*    (2006.01)

(52) U.S. Cl.
  CPC ....... *B60T 2201/16* (2013.01); *B60T 2210/12* (2013.01); *B60T 2220/03* (2013.01); *B60T 2250/03* (2013.01); *B60T 2270/14* (2013.01); *B60T 2270/304* (2013.01)

(58) Field of Classification Search
  USPC .................. 701/70, 79; 303/113.4, 146, 122; 188/72.6
  See application file for complete search history.

(56) References Cited

U.S. PATENT DOCUMENTS

| | | | |
|---|---|---|---|
| 6,019,436 A | 2/2000 | Skepker | |
| 6,254,202 B1 | 7/2001 | Kawamoto | |
| 6,311,808 B1* | 11/2001 | Halasy-Wimmer | B60R 25/08 188/106 F |
| 2001/0004723 A1* | 6/2001 | Nishiyama | B60T 8/3215 701/79 |
| 2002/0053828 A1* | 5/2002 | Shimizu | B60T 7/042 303/113.4 |
| 2005/0151419 A1* | 7/2005 | Watanabe | B60T 8/885 303/122 |
| 2007/0267916 A1* | 11/2007 | Mackovjak | B60T 8/1755 303/146 |
| 2010/0114445 A1 | 5/2010 | Groult | |
| 2012/0244547 A1 | 9/2012 | Mazzari et al. | |
| 2013/0253795 A1 | 9/2013 | Brueggemann et al. | |
| 2014/0129107 A1 | 5/2014 | Taylor et al. | |

FOREIGN PATENT DOCUMENTS

| | | |
|---|---|---|
| EP | 2342110 B1 | 11/2012 |
| JP | H06247176 A | 11/1994 |

\* cited by examiner

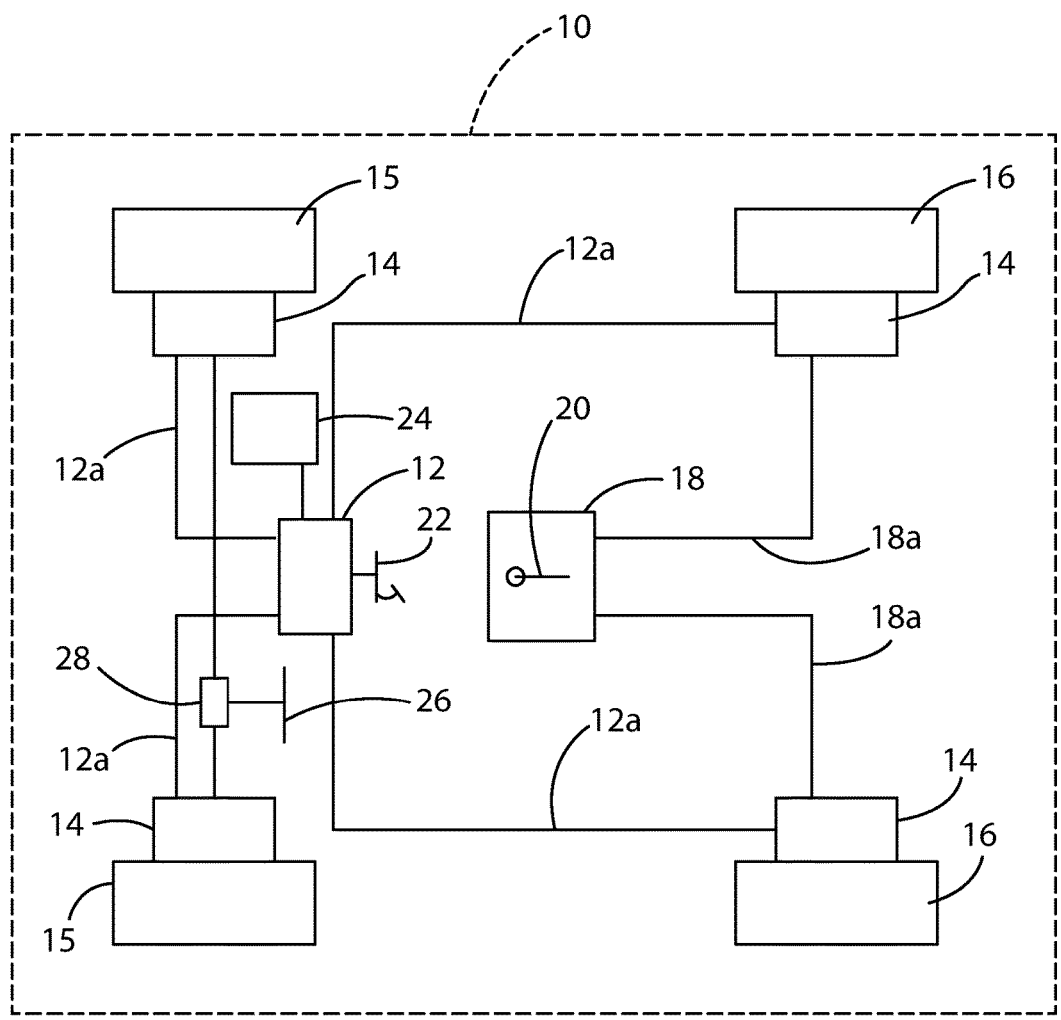

METHOD FOR OPERATING A MOTOR-VEHICLE BRAKING SYSTEM

CROSS-REFERENCE TO RELATED APPLICATIONS

This application is a National Stage of International Application No. PCT/EP2016/070451, filed Aug. 31, 2016, which claims priority to German Patent Application No. DE 102015216705.4, filed Sep. 1, 2015. The disclosures of the above applications are incorporated herein by reference.

BACKGROUND OF THE INVENTION

1. Field of the Invention

The present invention relates to a method for operating a braking system of a motor vehicle equipped with a wheel-slip control device, wherein the braking system includes an electrohydraulic service brake generating braking forces independently of an actuation by an operator, and a mechanical or electromechanical parking brake actuated by an actuating element.

2. Description of Related Art

It is generally known to provide specific actuating elements—such as handbrake levers or pedals, for example—for the parking brake in motor vehicles. Parking brakes have been constructed as purely mechanical parking brakes which, for example, are connected to the actuating element in the passenger compartment of the motor vehicle via a control cable. The operator or driver of the motor vehicle, actuates the actuating element—pulls the handbrake lever up or presses the pedal down—generating a torque on the handbrake lever or pedal transferred via the control cable into a tractive force that generates the locking force of the parking brake. In the case of electromechanical parking brakes, the force generated by the operator is replaced by an electromechanical force. Securing and releasing of parking brakes of such a type is instituted by an electric switch. Parking brakes are generally designed and suitable to hold the vehicle at a standstill by mechanical means, for example on an inclined roadway. The parking brake usually acts on the rear wheels of the vehicle.

With the aid of the service brake it is possible for the driver—with action that can be graduated—to decrease the speed of the vehicle during its operation or bring the vehicle to a standstill. Modern vehicles are equipped with an electrically controllable service-brake system capable of executing, in addition to an anti-lock braking function (ABS), an automatic braking function independent of operator actuation, for example a traction control system (TCS) or an electronic stability program (ESP). For this purpose, the service-brake system includes, in a known manner, an appropriately configured electrohydraulic service brake which, for example, is designed with an electrohydraulic control unit and/or with an electronically controllable brake booster, or a so-called "brake-by-wire" system. ABS, TCS, ESP and similar braking functions are realized by a device also designated herein as a wheel-slip control device.

Whereas a locking of the wheels of the vehicle upon actuation of the service brake is actively prevented, for example by the ABS function of the service-brake system, the parking brake is usually not suitable to lock the vehicle wheels braked by it, for example the rear wheels, during travel of the vehicle. Particularly on dry asphalt—a roadway with a high coefficient of friction—the parking-brake torque capable of being applied via the actuating element of the parking brake may not be sufficient to lock the corresponding wheels of the vehicle. This applies, in particular, to parking brakes that, for example, act on disk brakes of the motor vehicle capable of being actuated by the service brake. To bring about a locking of the wheels by the parking brake, a high expenditure of force is required, which usually is not capable of being applied by an average operator via the conventional actuating element of the parking brake.

Another known parking-brake concept enabling transmission of higher braking forces via the actuating element to the wheels, in particular rear wheels of the motor vehicle braked by the parking brake, provides a separate brake drum that can be acted on by the parking brake. The brake drum made available in a disk brake usually capable of being actuated by the service brake. However, a desired locking of the wheels braked by the parking brake cannot always be ensured under all operating conditions of the motor vehicle even with this braking concept. In addition, a parking-brake concept of such a type is associated with an increased manufacturing effort and gives rise to correspondingly higher costs.

In some situations, however, for example in dangerous situations and threatening situations or in motorsport, it is desirable for the driver of the vehicle to execute a so-called handbrake turning maneuver, or handbrake turn for short, in the course of which the vehicle is caused to adopt extreme drift angles—caused to oversteer—enabling turning the vehicle by 180° in an extremely short time, or to be able to take a particularly tight or—due to the roadway—difficult U-bends and S-bends. In this case, the rear wheels are caused to lock immediately by the parking brake retarding the wheels to allow the vehicle to skid. For example, in the motorsport field it is known to equip vehicles with special, particularly long parking-brake levers, wherein by virtue of the longer handbrake lever, a vehicle operator can apply the parking-brake torque required for locking the wheels. Purely hydraulic parking brakes are known as well from the motorsport field, but they are not permitted for road traffic, since these hydraulic parking brakes use the same hydraulic circuit as the service brake.

An electrohydraulic service brake is known from U.S. Patent Publication No. US 2014/0129107 A1 wherein the non-driven wheels of a vehicle axle can be secured against rolling away at a standstill, inasmuch as a hydraulic pressure is built up and maintained selectively for the service-brake circuits of these wheels, depending on an actuation of a switch by the driver. This capability can be utilized to bring about a spinning of the wheels of the driven axle of the vehicle, in order to increase, for example, the temperature of the spinning tires prior to subsequently driving away.

German Patent Publication No. DE 102010062816 A1 describes an electrohydraulic service brake, wherein an occurrence of a negative jump in the coefficient of friction of the roadway during a braking operation is monitored. Upon recognition of a braking maneuver on a roadway with a negative jump in the coefficient of friction the boost of a brake booster is set to a smaller value than in the case of a braking maneuver on a roadway without negative jump in the coefficient of friction.

U.S. Patent Publication No. US 2010/0114445 A1 discloses a driving-assistance system able to carry out an autonomous braking operation upon recognition of an obstacle in the path of travel of a vehicle. For the purpose of decreasing the braking reaction time, in the case of a hydraulic or electrohydraulic service brake, it is proposed to preload the brakes with the aid of an ABS pump of an ESP unit.

European Patent No. EP 2 342 110 B1 discloses an electromechanical service brake on a front axle of a vehicle, and of an electrohydraulic service brake on a rear axle of the vehicle. By means of an ESP unit, braking forces can be generated on the rear axle also independently of an actuation by an operator.

U.S. Pat. No. 6,254,202 B1 discloses an electrohydraulic service brake of a vehicle with an ABS control unit. In case of an emergency stop, additional brake pressure can be generated by a pump of the ABS unit in addition to the brake pressure normally generated by a master brake cylinder.

German Patent Publication No. DE 102007028070 A1 describes an electrohydraulic service brake for a motor vehicle with a regenerative brake unit and with an electric machine for driving/retarding the motor vehicle, wherein in the course of a regenerative braking operation the regenerative brake unit does not feed a volume of hydraulic fluid corresponding to the desire for braking into the wheel brakes but rather stores it in a hydraulic-fluid pressure accumulator of the regenerative brake unit.

Finally, the article "Electrohydraulic Brake System—The First Approach to Brake-by-Wire Technology" by Wolf-Dieter Jonner et al., SAE Technical Paper 960991, 1996, describes the general structure of so-called brake-by-wire braking systems.

Against this background, the present invention provides a method for operating a braking system having an electrohydraulic service brake, a mechanical or electromechanical parking brake, and a wheel-slip control device enabling a simplified implementation of a handbrake turn. The method requires no mechanical modifications in comparison with already known braking systems of such a type.

It should be pointed out that the features listed individually in the following description can be combined with one another in arbitrary, technically meaningful manner and demonstrate further configurations of the invention.

BRIEF DESCRIPTION OF THE DRAWINGS

The present invention will become more fully understood from the detailed description and the accompanying drawings, wherein:

The drawing is a schematic layout of a brake system according to one example of the present invention.

SUMMARY OF THE INVENTION

A method for operating a braking system of a motor vehicle equipped with a wheel-slip control device and a service brake set to generate a braking force independent of operator actuation. The system includes a parking brake actuated by an actuating element, with the parking brake acting on a rear wheel of the motor vehicle. During actuation of the parking brake generating a service brake hydraulic pressure that assists the parking brake braking the rear wheel wherein the hydraulic pressure is sufficient to lock the rear wheel being braked by the parking brake during travel of the motor vehicle.

The drawing shows schematic layout of one example of a brake system for use with one embodiment of the present invention. The brake system operates on a motor vehicle, seen schematically at 10. The motor vehicle 10 includes front wheels 15 and rear wheels 16 each of the wheels 15, 16 including a service brake, for example an electrohydraulic service brake 14. The brake system typically include various electrical, hydraulic and electrohydraulic components—such as an electronically controllable brake booster, one or more hydraulic pumps, electrically controllable valves, and hydraulic accumulators seen generally at 12, which supply hydraulic pressure through lines 12a to the service brakes 14. A wheel-slip control device 24 acting with the brake system 12 and the service brake 14 helps control wheel-slip. A brake pedal 22, typically depressed by the vehicle operator, actuates the brake system. However, as known, the wheel slip control device 24 acts independent of actuation of the brake pedal 22. The brake system may also include a parking brake 18 actuated through actuation element or lever 20. The parking brake 18 is connected through lines 18a to service brake 14. The vehicle also includes a steering wheel 16 acting through a steering gear 28 to steer the front wheels 15.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The present invention includes a method for operating a braking system of a motor vehicle 10 equipped with a wheel-slip control device 24, wherein the braking system is an electrohydraulic service brake 14, set to generate braking forces independently of an actuation by an operator through a brake pedal 22, and includes a mechanical or electromechanical parking brake 18 which can be actuated by an actuating element 20 and which acts, in particular, on the rear wheels 16 of the motor vehicle 10. In the case of an exemplary method according to the invention, an operator-side intent to actuate the parking brake 18 is recognized and subsequently during the actuation of the parking brake a hydraulic pressure of the service brake 14 is generated which acts on at least one wheel 16, in particular a rear wheel 16, of the motor vehicle capable of being braked by the parking brake, and is sufficient to lock the at least one wheel of the motor vehicle 10 capable of being braked by the parking brake during travel of the motor vehicle.

A wheel-slip control device, for example, is a device or a system for controlling the wheel-slip of the motor vehicle with the aid of the electrohydraulic service brake for a higher ride stability. Such devices may include, an anti-lock braking system (ABS), a traction control system (TCS), an active yaw control (AYC) and/or an electronic stability program (ESP). Such systems typically include various electrical, hydraulic and electrohydraulic components—such as an electronically controllable brake booster, one or more hydraulic pumps, electrically controllable valves, and hydraulic accumulators. The systems also include an electronic control unit for controlling these components operating to execute one or more of the aforementioned functions. Control of electrohydraulic components of the service brake enables, in particular, generation of braking forces independently of operator actuation. These wheel-slip control devices and electrohydraulically controlled brakes are known, for which reason they will not be discussed further.

The parking brake may be a purely mechanical parking brake actuated by an operator using an actuating element. The actuation element acting via a control cable on corresponding wheels, in particular rear wheels, of the motor vehicle to both secure and release the brake. The parking brake may be an electromechanical parking brake, wherein the force generated on the actuating element by the operator has been replaced by an electromechanical force. The actuating element may be a pedal or, preferably, a handbrake lever. In particular, the actuating element of an electromechanical parking brake may be an electric switch, via which the parking brake is actuated.

Since the method according to the invention can, after recognizing an operator-side intent to actuate the parking brake and during the actuation of the parking brake, bring about a locking of at least one wheel of the motor vehicle, in particular of at least one rear wheel, inasmuch as the braking force required for the locking is applied by the electrohydraulic service brake, it is also possible to carry out a handbrake turn with the motor vehicle, even though the motor vehicle is equipped with a wheel-slip control device which during normal operation substantially prohibits a wheel-slip. During the handbrake turn a wheel-slip of at least one wheel, in particular of at least one rear wheel of the motor vehicle, amounting to 100% is permitted temporarily. The electrohydraulic service brake intervenes and supports the parking brake such that a locking of at least one wheel of the motor vehicle braked by the parking brake is possible. When the parking brake is released or deactivated via the actuating element, the hydraulic pressure of the service brake for locking the at least one wheel is reduced. Subsequently the wheel-slip control device regulates the slip of all the wheels of the motor vehicle again in conventional manner.

In an exemplary embodiment, the method is implemented in the form of a computer-executable program within the wheel-slip control device, for example within the ESP control unit. Accordingly, no mechanical modifications of the braking system of the motor vehicle, in particular the service brake or the parking brake, or additional components for the braking system, are required. The programming of the corresponding control unit can be adapted to implement the method according to the invention.

Generation of the hydraulic pressure for locking at least one wheel of the motor vehicle during travel is preferably effected by a hydraulic pump of the wheel-slip control device, for example by an ABS hydraulic pump and/or ESP hydraulic pump. In this way, the components of the motor vehicle that are present in the braking system are used for executing the method according to the invention—for initiating and implementing the handbrake turn. There is no need for additional components.

The operator-side intent to actuate the parking brake is preferably registered by a sensor, usually or already present in the motor vehicle, that monitors an actuation or movement of the handbrake lever or pedal. In the case of an electric switch actuated for the purpose of activating the parking brake, the operator-side intent is directly evident from the actuation of the switch, which consequently can be registered unambiguously and simply. It is equally conceivable that an actuating element provided in the motor vehicle expressly for initiating a handbrake turn has been provided, in addition to the conventional handbrake lever or pedal, for example a separate handbrake lever or a separate switch. In this case, the operator-side intent to actuate the parking brake is recognizable directly from the actuation of this special actuating element.

An embodiment of the invention includes generation of service brake hydraulic pressure during actuation of the parking brake, the service brake intervenes and provides hydraulic pressure to assisting the parking brake only when the speed of the motor vehicle is within a predeterminable range. The speed range preferably defined by a predeterminable lower threshold value of the speed and a predeterminable upper threshold value of the speed. In this way, the handbrake turning maneuver occurs within a speed range in which a controlled handbrake turn by a driver is possible. Preferably, the lower threshold value of the speed can be set within a range from 0 km/h to 50 km/h, and the upper threshold value of the speed within a range from 0 km/h to 300 km/h.

According to another embodiment, during actuation of the parking brake the hydraulic pressure of the service brake is generated for the purpose of assisting said parking brake only when a lateral acceleration of the motor vehicle is greater than a predeterminable first threshold value of the lateral acceleration and/or a yaw acceleration of the motor vehicle is greater than a predeterminable threshold value of the yaw acceleration. Preferably, the first threshold value of the lateral acceleration can be set within a range from 0 m/s$^2$ to 10 m/s$^2$, and the threshold value of the yaw acceleration within a range from 0 deg/s$^2$ to 200 deg/s$^2$. In this way, initiation of the handbrake and in turn locking of at least one wheel, in particular rear wheel of the motor vehicle, is initiated only when the driver of the motor vehicle so indicates by actuation of the actuating element and steering into a curve, from which the lateral acceleration and the yaw acceleration result, that the driver intends to execute a handbrake turning maneuver. With parking brake activated during straight-ahead travel of the motor vehicle, no intervention occurs via the electrohydraulic service brake in respect of the wheels, in particular rear wheels, of the motor vehicle that are braked by the parking brake for the purpose of assisting said parking brake in the sense of the invention. Only the braking torque generated by the parking brake takes effect.

Furthermore, during the actuation of the parking brake the hydraulic pressure of the service brake for assisting the parking brake is preferably reduced as soon as the lateral acceleration of the motor vehicle is less than a predeterminable second threshold value of the lateral acceleration, preferentially set within a range from 0 m/s$^2$ to 10 m/s$^2$. In this case, intervention of the service brake with respect of the wheels, in particular rear wheels, of the motor vehicle that are braked by the parking brake, occurring for the purpose of assisting the parking brake, is terminated, so only the parking brake, so long as it is actuated, exerts a braking force on the corresponding wheels, in particular rear wheels.

Another embodiment provides that during the actuation of the parking brake the hydraulic pressure of the service brake is generated for the purpose of assisting the parking brake only when the algebraic sign of the yaw-rate is the same as the algebraic sign of the temporal change of the steering-wheel angle. This ensures the driver of the motor vehicle is steering in the direction of rotation of the vehicle about the vertical axis thereof and indicating an implementation of the handbrake turn.

Moreover, during actuation of the parking brake, the hydraulic pressure of the service brake for assisting the parking brake is preferably reduced as soon as the steering-wheel angle is greater than a predeterminable threshold value of the steering-wheel angle and the algebraic sign of the steering-wheel angle is not the same as the algebraic sign of the yaw-rate. Intervention of the service brake on the wheels, in particular rear wheels, of the motor vehicle that are braked by the parking brake, for the purpose of assisting the parking brake, is terminated as soon as the driver of the motor vehicle exceeds a certain degree of an opposite lock of the steering wheel. So long as the parking brake remains actuated it acts, on its own, on the corresponding wheels, in particular rear wheels, of the motor vehicle. The threshold value of the steering-wheel angle can preferably be set within a range from 0° to 500°.

According another embodiment, during actuation of the parking brake the hydraulic pressure of the service brake is generated for the purpose of assisting the parking brake only when a coefficient of friction of the roadway surface is greater than a predeterminable threshold value of the coefficient of friction. Intervention of the service brake occurs only when the intervention is necessary by reason of a relatively high coefficient of friction of the roadway surface, for example on dry asphalt, since the braking torque capable of being applied by the parking brake is not sufficient on its own to lock the at least one wheel, in particular rear wheel, of the motor vehicle. For example, on snow or ice a braking force sufficient for locking the wheel can usually be transmitted by the operator of the parking brake with the aid of the parking brake, wherein no intervention by the service brake is necessary. The threshold value of the coefficient of friction can preferably be set within a range from 0 to 1.2.

The coefficient of friction of the roadway surface is preferably ascertained or estimated by the ESP control unit of the wheel-slip control device. During operation of the vehicle the ESP control unit can, for example, determine the acceleration at which the motor vehicle or one of its wheels becomes unstable, from which the coefficient of friction of the roadway surface can be estimated. The acceleration can be determined on the basis of the ESP sensors, such as, for example, a longitudinal-acceleration sensor and/or transverse-acceleration sensor and/or yaw-rate sensor and/or wheel-speed sensor. The coefficient of friction ascertained by the ESP control unit then serves as input value for executing the method according to the invention.

Yet another embodiment provides that during actuation of the parking brake the hydraulic pressure of the service brake is generated for the purpose of assisting the parking brake only when a brake-light switch is inactive and the main hydraulic pressure of the service brake is less than a predeterminable threshold value of the main hydraulic pressure. Consequently, no intervention of the service brake for the purpose of assisting the parking brake is carried out if the driver of the motor vehicle intends to carry out a conventional braking with the service brake. The threshold value of the main hydraulic pressure can preferably be set within a range from 0 bar to 10 bar.

As soon as the driver of the motor vehicle actuates the service brake during the execution of the handbrake turn, the brake-light switch is active or the main hydraulic pressure of the service brake is greater than the predeterminable threshold value of the main hydraulic pressure, the hydraulic pressure of the service brake generated for the wheels, in particular rear wheels, of the motor vehicle that are braked by the parking brake during the actuation of the parking brake is preferably reduced again such that the one locked wheel or the several locked wheels is/are no longer locked. Intervention of the service brake for the purpose of implementing the handbrake turn is consequently terminated.

Another embodiment of the invention provides that during actuation of the parking brake the hydraulic pressure of the service brake is generated for the purpose of assisting the parking brake only when wheel-slip of a wheel on the inside of the curve, in particular of a rear wheel on the inside of the curve, is greater than a predeterminable first threshold value of the wheel-slip. Providing recognition that the driver intends to take a curve with the parking brake actuated, from which driver intent for a handbrake turn is determined. The first threshold value of the wheel-slip can preferably be set within a range from 0% to 100%.

Moreover, during actuation of the parking brake the hydraulic pressure of the service brake for assisting the parking brake is preferably reduced when the wheel-slip of a wheel on the inside of the curve, in particular of a rear wheel on the inside of the curve, is less than a predeterminable second threshold value of the wheel-slip. The second threshold value of the wheel-slip can preferably be set within a range from 0% to 100%.

According to another embodiment, during actuation of the parking brake the hydraulic pressure of the service brake for assisting the parking brake is generated at most for a predeterminable intervention period. This ensures that intervention of the service brake for the purpose of assisting the parking brake in is terminated, at the latest, after the intervention period has been attained. The intervention period can preferably be set within a range from 0 s to 10 s.

An additional embodiment provides that after generation of the hydraulic pressure of the service brake, during the actuation of the parking brake and for assisting the parking brake, during the actuation of the parking brake the hydraulic pressure of the service brake is reduced as soon as a throttle position of the engine of the motor vehicle is greater than a predeterminable threshold value of the throttle position. When the driver wants to accelerate the motor vehicle after execution of the handbrake turn, the intervention of the service brake for the purpose of assisting the parking brake is terminated. The threshold value of the throttle position can preferably be set within a range from 0% to 110%.

Furthermore, it may be advantageous to activate intervention of the service brake for the purpose of implementing the handbrake turn, when the ESP function of the motor vehicle has been switched off by the driver. In addition, there may also be provision wherein the driver may set a special drift mode for the motor vehicle permitting intervention of the service brake for the purpose of assisting the handbrake turn.

In the case of a motor vehicle with selectable all-wheel drive (AWD), there may be a provision wherein an AWD clutch uncouples the front wheels from the rear wheels, at least partially, as soon as an intervention of the service brake for the purpose of assisting the parking brake occurs, in order to be able to carry out the handbrake turning maneuver. It may be advantageous not to open the AWD clutch completely but merely reduce the torque capable of being transmitted by it, to return again as quickly as possible to the all-wheel mode of the motor vehicle after the termination of the intervention of the service brake for the purpose of implementing the handbrake turn.

Intervention of the service brake for the purpose of assisting the parking brake in the sense of the invention may be carried out on both rear wheels of the motor vehicle. For this purpose, the two rear wheels are acted upon by the service brake with a settable brake pressure preferably set within a range from 0 bar to 200 bar. Furthermore, the brake pressure applied to the rear wheel on the inside of the curve may preferably be decreased by a predeterminable factor in comparison with the brake pressure applied to the rear wheel on the outside of the curve. However, the two brake pressures may also be the same. The predeterminable factor can preferably be set within a range from 0 to 1.

In one embodiment, the described method is used in an electronic control unit of a wheel-slip control device of a motor vehicle, in particular in an ESP control unit of the motor vehicle.

Consequently, the method may be used with a motor vehicle having a braking system operable based on operator intent to actuate a parking brake, wherein actuation of the parking brake is recognized. Subsequently, during actuation of the parking brake, a hydraulic pressure of the service brake is generated that acts on at least one wheel, in particular rear wheel, of the motor vehicle capable of being braked by the parking brake, and is sufficient to lock the at least one wheel of the motor vehicle during travel of the motor vehicle. The vehicle including an electrohydraulic service brake, set to generate braking forces independently of an actuation by an operator, a mechanical or electromechanical parking brake, which can be actuated by an actuating element and acts, in particular, on the rear wheels of the motor vehicle, and a wheel-slip control device with a control unit suitable for implementing the previously described method according to the invention. With regard to further configurations, advantages and effects of the apparatus according to the invention, the foregoing remarks presented in connection with the description of the method according to the invention apply in analogous manner.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for operating a braking system of a motor vehicle equipped with a wheel-slip control device; a service brake set to generate a braking force independent of operator actuation; a parking brake actuated by an actuating element, the parking brake acting on a rear wheel of the motor vehicle, including during actuation of the parking brake generating a service brake hydraulic pressure that assists said parking brake in braking said rear wheel, said service brake hydraulic pressure sufficient to lock said rear wheel being braked by the parking brake during travel of the motor vehicle wherein during actuation of the parking brake the hydraulic pressure of the service brake assists said parking brake only when a wheel-slip of the rear wheel on the inside of the curve is greater than a predeterminable first threshold value of the wheel-slip, and during the actuation of the parking brake the hydraulic pressure of the service brake assisting said parking brake is reduced when the wheel-slip of a rear wheel on the inside of the curve is less than a predeterminable second threshold value of the wheel-slip.

2. The method of claim 1 wherein during the actuation of the parking brake the hydraulic pressure of the service brake is generated and assists said parking brake only when a speed of the motor vehicle is within a predeterminable range.

3. The method of claim 1 including during actuation of the parking brake reducing the hydraulic pressure of the service brake assisting said parking brake when the lateral acceleration of the motor vehicle is less than a predeterminable threshold value of the lateral acceleration.

4. The method of claim 1 including during the actuation of the parking brake reducing the hydraulic pressure of the service brake for assisting said parking brake so the rear wheel is no longer locked when a brake-light switch is active or the main hydraulic pressure of the service brake is greater than the predeterminable threshold value of the main hydraulic pressure.

5. The method of claim 1 wherein during the actuation of the parking brake the hydraulic pressure of the service brake assists said parking brake for a predeterminable intervention period.

6. The method of claim 1 wherein after generation of the hydraulic pressure of the service brake during the actuation of the parking brake to assist said parking brake the hydraulic pressure of the service brake during the actuation of the parking brake is reduced when a throttle position of the engine of the motor vehicle is greater than a predeterminable threshold value of the throttle position.

7. A method for operating a braking system of a motor vehicle equipped with a wheel-slip control device; a service brake set to generate a braking force independent of operator actuation; a parking brake actuated by an actuating element, the parking brake acting on a rear wheel of the motor vehicle, including during actuation of the parking brake generating a service brake hydraulic pressure that assists said parking brake in braking said rear wheel, said service brake hydraulic pressure sufficient to lock said rear wheel being braked by the parking brake during travel of the motor vehicle wherein during the actuation of the parking brake the hydraulic pressure of the service brake assists said parking brake only when the algebraic sign of the yaw-rate is the same as the algebraic sign of the temporal change of the steering-wheel angle, and during the actuation of the parking brake the hydraulic pressure of the service brake assisting said parking brake is reduced when the steering-wheel angle is greater than a predeterminable threshold value of the steering-wheel angle and the algebraic sign of the steering-wheel angle is not the same as the algebraic sign of the yaw-rate.

8. A method for operating a braking system of a motor vehicle equipped with a wheel-slip control device; a service brake set to generate a braking force independent of operator actuation; a parking brake actuated by an actuating element, the parking brake acting on a rear wheel of the motor vehicle, including during actuation of the parking brake generating a service brake hydraulic pressure that assists said parking brake in braking said rear wheel, said service brake hydraulic pressure sufficient to lock said rear wheel being braked by the parking brake during travel of the motor vehicle wherein during actuation of the parking brake the hydraulic pressure of the service brake assists said parking brake only when a coefficient of friction of a roadway surface is greater than a predeterminable threshold value of the coefficient of friction.

9. A method for operating a vehicle braking system comprising:
    a service brake generating a braking force independently of actuation by an operator;
    a parking brake having an actuating element acting on a rear wheel wherein during actuation of the parking brake a service brake hydraulic pressure assists said parking brake in locking said rear wheel during travel of the motor vehicle only when a wheel-slip of the rear wheel on the inside of a curve is greater than a predeterminable first threshold value of the wheel-slip, and during the actuation of the parking brake the hydraulic pressure of the service brake assisting said parking brake is reduced when the wheel-slip of a rear wheel on the inside of the curve is less than a predeterminable second threshold value of the wheel-slip.

10. The method of claim 9 including a wheel-slip control device, said wheel-slip device operative to control said service brake hydraulic pressure.

11. The method of claim 10 wherein said wheel-slip control device has electrohydraulic components including a hydraulic pumps and electrically controllable valves.

12. The method of claim 9 including a wheel-slip control device having an electrohydraulic component and deactivating said wheel-slip control device using said electrohydraulic component to generate a service brake hydraulic pressure when said wheel-slip control device is deactivated.

* * * * *